(12) United States Patent
Kuo et al.

(10) Patent No.: US 10,270,875 B1
(45) Date of Patent: *Apr. 23, 2019

(54) DYNAMIC GROUPING OF DEVICE REPRESENTATIONS

(71) Applicant: Amazon Technologies, Inc., Seattle, WA (US)

(72) Inventors: Calvin Yue-Ren Kuo, Mercer Island, WA (US); Mark Edward Rafn, Cambridge (GB); James Christopher Sorenson, III, Seattle, WA (US); Shyam Krishnamoorthy, Redmond, WA (US); Jonathan I. Turow, Seattle, WA (US); William Alexander Stevenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/269,741

(22) Filed: Sep. 19, 2016

(51) Int. Cl.
*H04L 15/16* (2006.01)
*H04L 29/08* (2006.01)

(52) U.S. Cl.
CPC ...... *H04L 67/2833* (2013.01); *H04L 67/2804* (2013.01); *H04L 67/2861* (2013.01)

(58) Field of Classification Search
CPC ......... H04L 67/12; H04L 67/16; H04L 67/20; H04L 67/26; H04L 67/28; H04L 67/2833; H04L 67/2842; H04L 61/2069; H04L 41/18; H04L 41/0893
USPC .......................... 709/213, 220, 221, 224, 226
See application file for complete search history.

(56) References Cited

U.S. PATENT DOCUMENTS

| 2013/0159451 | A1* | 6/2013 | Luciw | H04L 67/2842 709/213 |
| 2014/0241354 | A1* | 8/2014 | Shuman | H04L 67/16 370/390 |
| 2014/0244568 | A1* | 8/2014 | Goel | H04W 4/08 706/52 |
| 2014/0244834 | A1* | 8/2014 | Guedalia | H04L 67/16 709/224 |
| 2014/0244838 | A1* | 8/2014 | Ryu | H04L 43/04 709/224 |

(Continued)

OTHER PUBLICATIONS

Serbanati A, Medaglia CM, Ceipidor UB. Building blocks of the internet of things: State of the art and beyond. InDeploying RFID-Challenges, Solutions, and Open Issues Aug. 17, 2011. IntechOpen. (Year: 2011).*

(Continued)

*Primary Examiner* — Ranodhi Serrao
*Assistant Examiner* — James N Fiorillo
(74) *Attorney, Agent, or Firm* — Thorpe North & Western, LLP.

(57) ABSTRACT

A technology is described for managing dynamic groups of devices using device representations. An example method may include receiving a request for a dynamic group of device representations. In response to the request, a membership parameter used to identify member device representations included in the dynamic group of device representations may be obtained. Device representations may be queried using the membership parameter to identify member device representations that have a state that corresponds to the membership parameter, and the dynamic group of device representations may be generated to include identifiers for the member device representations.

23 Claims, 10 Drawing Sheets

(56) References Cited

U.S. PATENT DOCUMENTS

| | | | | |
|---|---|---|---|---|
| 2015/0130957 A1* | 5/2015 | Berelejis | | H04L 67/12 348/211.1 |
| 2015/0134761 A1* | 5/2015 | Sharma | | H04L 67/26 709/207 |
| 2015/0237071 A1* | 8/2015 | Maher | | H04L 63/20 726/1 |
| 2015/0249672 A1* | 9/2015 | Burns | | H04L 12/66 726/4 |
| 2015/0256385 A1* | 9/2015 | Chandhok | | H04L 41/18 715/734 |
| 2015/0319046 A1* | 11/2015 | Plummer | | H04L 12/2807 715/736 |
| 2015/0365480 A1* | 12/2015 | Soto | | H04L 12/2827 709/224 |
| 2016/0041534 A1* | 2/2016 | Gupta | | G05B 13/0265 700/275 |
| 2016/0072638 A1* | 3/2016 | Amer | | H04L 12/2818 398/106 |
| 2016/0165650 A1* | 6/2016 | Kim | | H04W 12/06 370/329 |
| 2016/0249439 A1* | 8/2016 | Recker | | H02J 9/02 |
| 2016/0285840 A1* | 9/2016 | Smith | | H04W 4/70 |
| 2016/0364553 A1* | 12/2016 | Smith | | G06F 21/105 |
| 2017/0063946 A1* | 3/2017 | Quan | | H04L 67/20 |
| 2017/0083396 A1* | 3/2017 | Bishop | | G06F 11/14 |
| 2017/0223130 A1* | 8/2017 | Profit | | H04L 67/2842 |
| 2017/0284691 A1* | 10/2017 | Sinha | | G05B 19/0426 |
| 2017/0311368 A1* | 10/2017 | Kandur Raja | | H04W 76/14 |
| 2017/0322904 A1* | 11/2017 | Jenks | | H04W 4/70 |
| 2018/0097651 A1* | 4/2018 | Guedalia | | H04L 67/16 |

OTHER PUBLICATIONS

Guth J, Breitenbücher U, Falkenthal M, Leymann F, Reinfurt L. Comparison of IoT platform architectures: A field study based on a reference architecture. InCloudification of the Internet of Things (CIoT) Nov. 23, 2016(pp. 1-6). IEEE. (Year: 2016).*

* cited by examiner

DYNAMIC GROUPING OF DEVICE REPRESENTATIONS

RELATED APPLICATIONS

This application is related to U.S. Utility patent applications entitled "GROUP COMMAND MANAGEMENT FOR DEVICE GROUPS" and "AGGREGATED GROUP STATE FOR A GROUP OF DEVICE REPRESENTATIONS" filed concurrently on Sep. 19, 2016, and are incorporated by reference herein.

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for the purpose of transmitting status and receiving external control communications.

DETAILED DESCRIPTION

A technology is described for dynamically grouping device representations that represent stored states of devices (e.g., shadow states). A device may be one of many devices that create a large network of addressable devices. This entire "network" is commonly referred to as the Internet of Things (IoT). The devices may be network addressable and/or eventually addressable (e.g., capable of receiving relayed messages) by a device shadowing service configured to manage device representations that electronically represent the devices.

A device representation may represent one or more states of a device. In one example, a device state represented by a device representation may include a recorded state and a desired state. The recorded state may be the last known state of a device, and a desired state may be a state to which the device may be instructed to assume when the device is available to receive instructions. Device representations may be grouped into dynamic groups of device representations based in part on one or more states of the device representations. For example, a dynamic group of device representations may be created using a group definition that defines the dynamic group. The group definition may be used to identify device representations which have a state corresponding to the group definition. In one example, a group definition may include one or more membership parameters (e.g., "on", "open", "full") that may be used to identify device representations that have states (e.g., "on", "open", "full") that correspond to the membership parameters. Device representations having states that correspond to the membership parameters may be identified and included in the dynamic group.

A dynamic group of device representations may be updated to add and/or remove device representations as the states of the device representations change. As an illustration, a group definition for a dynamic group of device representations may include a geo-fence parameter that may be used to identify device representations with a location reported by the devices represented by the device representations that is within the location defined by the geo-fence parameter. The dynamic group of device representations may be updated as devices associated with the device representations move in and out of the location defined by the geo-fence parameter and report the devices' current locations to a device shadowing service that updates the device representations with the devices' current locations.

Figure 1A:
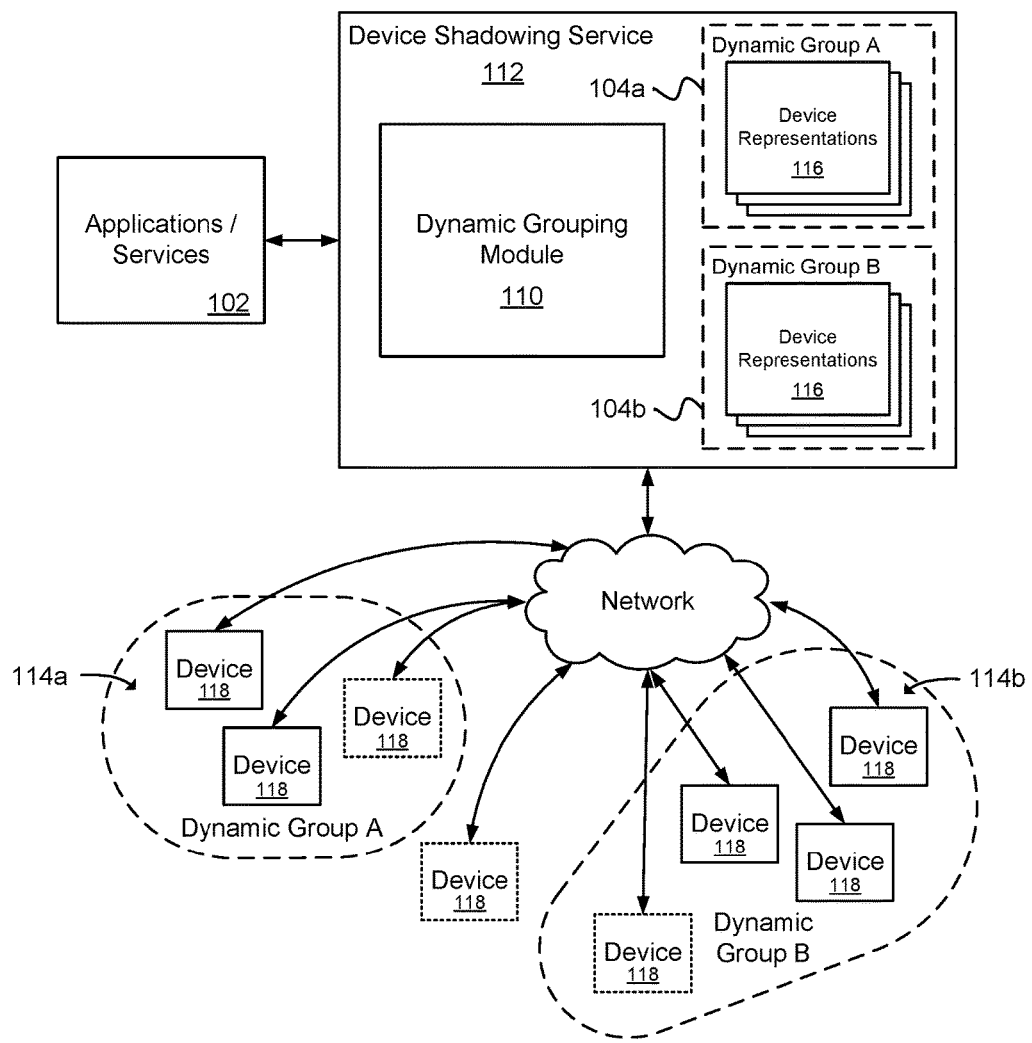
FIGS. 1a-b are block diagrams illustrating example systems for managing dynamic groups of devices using dynamic groups of device representations.

FIG. 1a is a block diagram illustrating a high level example of a system for managing dynamic groups of devices 114a-b using dynamic groups of device representations 104a-b. The system may include a device shadowing service 112 configured to manage dynamic groups of device representations 104a-b. As illustrated, the device shadowing service 112 may include a dynamic grouping module 110 configured to identify device representations 116 included in a dynamic group of device representations 104a-b, and in some examples, manage the dynamic group of device representations 104a-b.

A device representation 116 may be an electronic representation (e.g., a data object containing device state) of a device 118 that can be referenced via a computer network (e.g., the internet and/or a virtual network of a service provider environment) and updated, even at times that the device 118 itself may be unreachable. For example, to conserve power, some battery-powered and other devices 118 may disable wireless radios when not actively transmitting data to a device shadowing service 112 or polling the device shadowing service 112 for updates. In another example, a computing device in a tractor may be turned off when the tractor is turned off. For these and other reasons, a device 118 may connect to a network intermittently, while an application or service 102 may attempt to interact with the device 118 at times that the device 118 may not be connected to the network or may not otherwise be available. In order to overcome limitations associated with intermittent connectivity, network bandwidth, and/or computing capacity, the device shadowing service 112 may maintain a cached device representation 116 for a device 118 that allows an application and/or service 102 to access information, such as state information, for the device 118 at any time.

A device 118 may report state changes and other information for the device 118 to the device shadowing service 112, and the reported information may be stored within the device representation 116. A device representation 116 may represent a state emitted by a device 118, which may be any state assumed by the device 118 (e.g., "on" or "off", "open" or "closed", "full" or "empty") or detected by the device 118 via a sensor (e.g., location, temperature, or chemical composition). A device representation 116 may represent multiple states of a device 118. As a specific example, a device representation 116 for a device 118 that reports location, temperature, and humidity data may represent each state, (location, temperature, and humidity) reported by the device 118.

Device representations 116 may be grouped into dynamic groups of device representations 104*a-b* based in part on one or more states represented by the device representations 116. A state used to define a dynamic group of device representations 104*a-b* may be changeable (e.g., change from "on" to "off"). Changes to the state in the device representations 116 may result in device representations 116 being added or removed from the dynamic group of device representations 104*a-b*. As an example, a state of "on" may be used to define a dynamic group of device representations 104*a-b*. Device representations 116 having a state of "on" may be added to the dynamic group of device representations 104*a-b*. In the case that a device representation 116 is updated to a state of "off", the device representation 116 may be removed from the dynamic group of device representation 104*a-b*. Thereafter, if the state of the device representation 116 is updated to "on", the device representation may be added back to the dynamic group of device representations 104*a-b*.

As will be appreciated, any number of states may be combined to define a dynamic group of device representations 104*a-b*. As an example, a changeable state and a fixed state may be used to define a dynamic group of device representations 104*a-b*. For example, a changeable state of "on" and a fixed state of "light bulb" may be used to define a dynamic group of device representations 104*a-b*. Accordingly, identifying member device representations 116 included in the dynamic group may comprise querying device representations 116 (e.g., a device representation database) for device representations 116 that have a device type of "light bulb" and have a power state of "on".

Figure 1B:
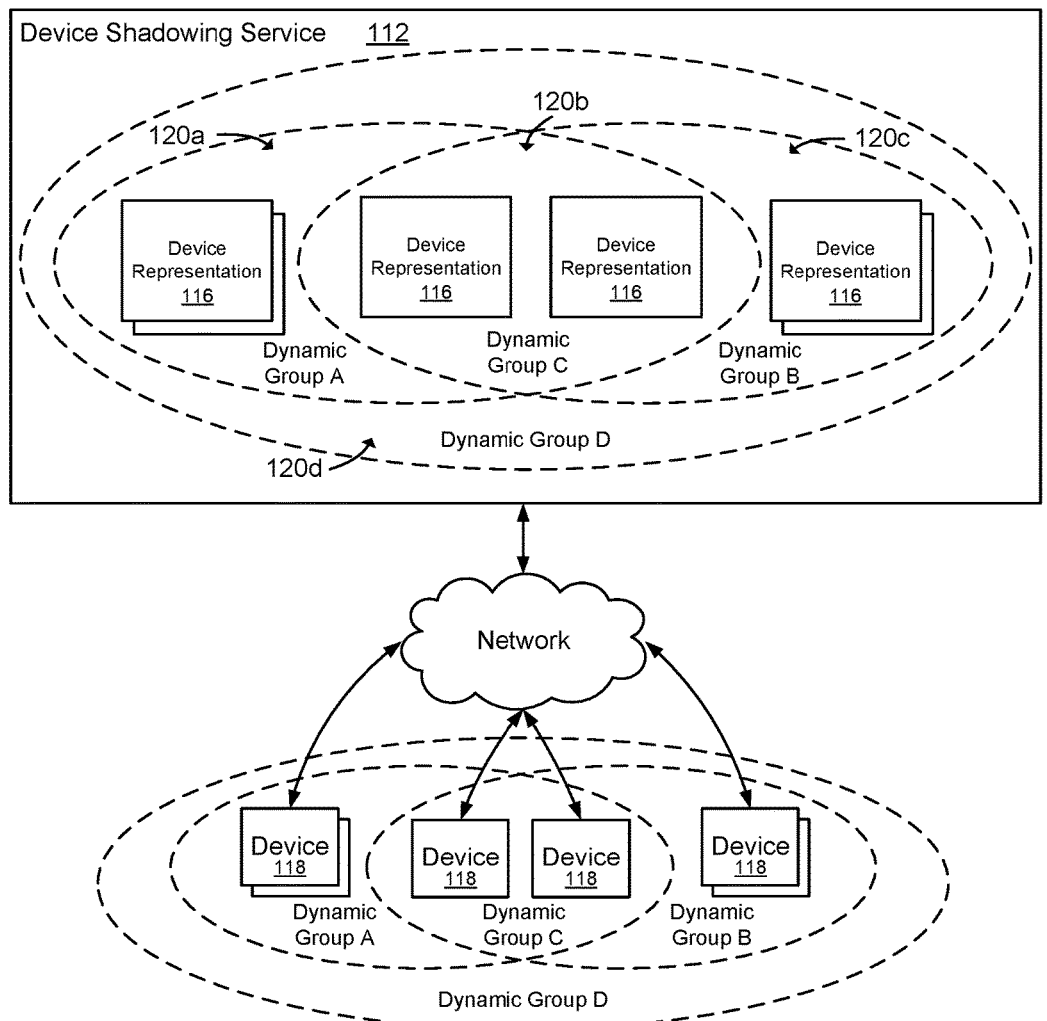

Moreover, as illustrated in FIG. 1*b*, a device representation 116 may be a member of more than one dynamic group of device representations. For example, a device representation 116 may be simultaneously a member of a first dynamic group of device representations 120*a* and a member of a second dynamic group of device representations 120*c*. As a specific example, a network addressable light may be a member of both a first floor group of "on" lights and a building group of "on" lights. Alternatively, device representations may be exclusive to a dynamic group of representations. For example, a device representations that represents a device located in a specific region may be included in a dynamic group for the region, but may not be included in dynamic group for other regions.

Also, as illustrated in FIG. 1*b*, dynamic groups of device representations may be created by identifying a group created by device representations 116 that are included in an intersection of dynamic groups of device representations or a union of dynamic groups of device representations. In one example, device representations 116 may be queried to identify an intersection of member device representations 116 included in a first dynamic group of device representations 120*a* and a second dynamic group of device representations 120*c*, and the member device representations 116 identified may be defined as a third dynamic group of device representations 120*b*. In another example, device representations 116 may be queried to identify a union of member device representations included in a first dynamic group of device representations 120*a* and a second dynamic group of device representations 120*c*, and the union of device representations may be included in a fourth dynamic group of device representations 120*d*.

Returning to FIG. 1*a*, in one example, the dynamic grouping module 110 may be configured to generate a dynamic group of device representations 104*a-b* in response to a request for the dynamic group of device representations 104*a-b*. The request may be for a device representation listing, or for a dynamic group registry that includes identifiers for member device representations 116 included in a dynamic group of device representations 104*a-b*. In response to the request for the dynamic group of device representations 104*a-b*, a group definition for the dynamic group of device representations 104*a-b* may be used to identify the device representations 116 included in the dynamic group of device representations 104*a-b*.

The group definition may include one or more membership parameters used to identify device representations 116 that have states that correspond to the membership parameters. For example, device representations 116 managed by the device shadowing service 112 may be queried using one or more membership parameters (e.g., query a data store for device representation records that match membership parameters). Those device representations 116 having states that correspond to the membership parameters may be returned in response to the query. More specifically, identifiers (or alternatively addresses) for the device representations 116 may be returned by the query and the identifiers may be included in a listing of device representations 116 that may be returned to a requesting client, or the identifiers may be used to generate a dynamic group registry.

In some examples, a group definition for a dynamic group of device representations 104*a-b* may include a membership parameter that specifies authentication information needed to be included in the dynamic group of device representations 104*a-b*. Authentication information may include, but is not limited to: a token, digital rights, a digital certificate and/or a public key of a public key-private key pair. In generating a dynamic group of device representations 104*a-b*, authentication information may be used in combination with other membership parameters to query the device representations 116 managed by the device shadowing service 112 and identify device representations 116 that have the authentication information. For example, customer authentication information may be used to identify device representations 116 that are accessible to a customer in response to a customer request for a dynamic group of device representations 104a-b. Also, requests to add device representations 116 to a dynamic group of device representations 104a-b may include authentication information that corresponds with a membership parameter for the dynamic group.

In an example where a dynamic group registry may be generated, the dynamic group registry may be updated as membership of device representations 116 included in a dynamic group of device representations 104a-b changes. In one example, device representations 116 managed by the device shadowing service 112 may be re-queried periodically in order to identify device representations 116 that have states that correspond to one or more membership parameters and regenerate the dynamic group registry to include the device representations 116 (i.e., identifiers for the device representations 116). In another example, a dynamic group registry may be updated in response to a state change event that updates the state of a device representation 116. For example, a state change event may update the state of a device representation 116 to correspond to a membership parameter, resulting in the device representation 116 being added to a dynamic group registry, or a state change event may result in updating the state of the device representation 116 to no longer correspond to the membership parameter, wherein the device representation 116 may be removed from the dynamic group registry.

In one example, the state of a device representation 116 included in a dynamic group of device representations 104a-b may be monitored using the dynamic grouping module 110 (or the device shadowing service 112) for state change events that result in reassigning the device representation 116 to another dynamic group of device representations 104a-b. For example, in the case that the state of a device representation 116 no longer corresponds to a membership parameter for a first dynamic group of device representations 104a, the state of the device representation 116 may be used to identify a second dynamic group of device representations 104b that has a membership parameter that corresponds to the state of the device representation 116. As an illustration, as a device 118 moves from a first location to a second location, the first location represented by a device representation 116 for the device 118 may be updated to the second location. The state represented by the device representation 116 may be monitored and when the state changes from the first location to the second location, a dynamic group of device representations 104a-b associated with the second location may be identified and the device representation 116 may be reassigned to the dynamic group of device representations 104a-b.

In another example, a state change event associated with a device representation 116 may trigger a request to the dynamic grouping module 110 to include the device representation 116 in a dynamic group of device representations 104a-b that has a membership parameter that corresponds to the updated state of the device representation 116. As an illustration, in response to updating a state of a device representation 116 from a first location to a second location, a request may be triggered asking that the device representation 116 be added to a dynamic group of device representations 104a-b associated with the second location.

In some examples, rules or logic may be associated with state change events that result in updating the device representation membership of a dynamic group of device representations 104a-b. For example, a rule associated with a dynamic group of device representations 104a-b may be executed in response to a state change event that updates a dynamic group registry. Execution of a rule may cause the performance of a function associated with a dynamic group of device representations 104a-b. For example, a rule may be configured to send a notification to a customer informing the customer of a change in the customer's dynamic group of devices 114a-b, or a rule may be configured to instruct devices 118 represented by device representations 116 included in a dynamic group to report a current state to the device shadowing service 112, assume a specified state, or perform some other action.

As indicated above, in some examples, a device representation 116 may be added or removed from a dynamic group of device representations 104a-b in response to a request to add the device representation 116 to the dynamic group of device representations 104a-b or remove the device representation 116 from the dynamic group of device representations 104a-b. As one example, a customer may request that a device representation 116 be added to a dynamic group registry (e.g., a customer may request that a device representation 116 for a network addressable lamp be added to a dynamic group registry for a group of device representations 104a-b that represents network addressable lights). In response to the request, a determination may be made that one or more states of the device representation 116 being added to the dynamic group registry corresponds to one or more membership parameters for the device representations 116 included in the dynamic group registry (e.g., a determination may be made that a location of a network addressable lamp corresponds to a membership parameter for a dynamic group registry of network addressable lights located on a second floor). Thereafter, an identifier for the device representation 116 may be added to the dynamic group registry, resulting in adding the device representation 116 to the dynamic group of device representations 104a-b.

In at least some examples, a device representation 116 may be added to a dynamic group of device representations 104a-b by subscribing the device representation 116 to a named logical channel (e.g., topic) associated with the dynamic group of device representations 104a-b. A named logical channel may be a communications channel managed by a publication/subscription broker service, which sends messages to clients registered to receive the messages via the named logical channel. A named logical channel may be created for a dynamic group of device representations 104a-b and subscribers to the named logical channel may obtain information associated with the dynamic group of device representations 104a-b and/or submit commands to the dynamic group of device representations 104a-b. Illustratively, an authorized device 118 may subscribe to the named logical channel and thereafter, a device representation 116 for the device 118 may be added to the dynamic group of device representations 104a-b.

In one example, a dynamic group registry or listing of device representations may be exposed to a device representation API (Application Programing Interface), enabling customers of the device shadowing service 112 to request information associated with a dynamic group of device representations 104a-b and/or send commands to the dynamic group of device representations 104a-b. For example, the device representation API may be a RESTful API that provides an endpoint to a dynamic group of device representations 104a-b. The device representation API may allow customers to request actions related to a dynamic group of device representations 104a-b that may include retrieving a group state of the dynamic group of device representations 104a-b (e.g., an aggregated state), updating the state of the dynamic group of device representations 104a-b, or deleting the dynamic group of device representations 104a-b.

Figure 2:
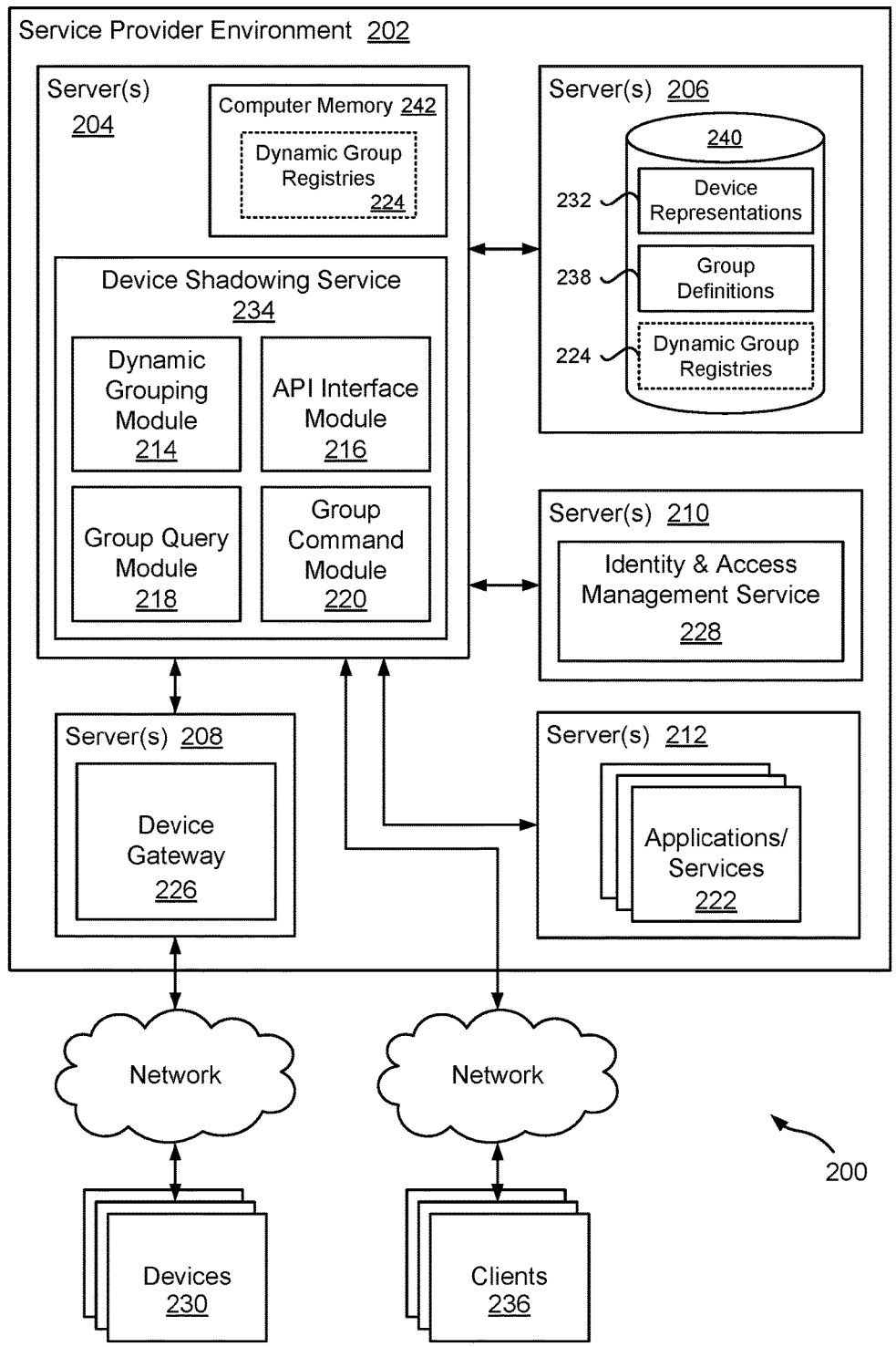
FIG. 2 is a block diagram that illustrates various example components included in a system for managing dynamic groups of devices using device representations.

FIG. 2 illustrates components of an example system 200 on which the present technology may be executed. The system 200 may include a plurality of devices 230 in communication with a service provider environment 202 via one or more networks. Illustratively, the devices 230 can include connected: global positioning devices, temperature sensors, water sensors, light switches, light bulbs, power outlets, watches, media players, voice command devices, video cameras, security systems, door locks, smoke alarms, thermostats, weather sensors, tractors, vehicles, watering devices, handheld devices, as well as any other device configured to communicate over a network.

The service provider environment 202 may include servers that host the components of the system 200. A server 204 may host a device shadowing service 234 configured to manage device representations 232 associated with the devices 230. The device representations 232 may, in one example, include data objects stored using a data-interchange format like JavaScript Object Notation (JSON) in an object data store, NoSQL data store, or a relational data store. The device representations 232 may be accessible to clients 236 that may operate outside of the service provider environment 202, and applications and/or services 222 hosted on a server 212 within the service provider environment 202 via the device shadowing service 234 at any time without the need to wake up or otherwise contact an associated device 230.

The device shadowing service 234 may manage the states represented by the device representations 232. For example, the device shadowing service 234 may update a state represented by a device representation 232 in response to state change requests received from clients 236 and/or applications and services 222, or in response to output received from devices 230 represented by the device representations 232. In one example, a device representation 232 may represent a state of a device 230 as a recorded state and a desired state. The recorded state may be the last known state of the device 230 represented by the device representation 232, and the desired state may be a state to which the device 230 may be instructed to assume. For example, a client 236, application and/or service 222 may request that a device 230 assume a desired state. In response, the device shadowing service 234 may be configured to update the desired state of a device representation 232 that represents the device 230 to the desired state. The device 230 may then be instructed to assume the desired state. Thereafter, an indication that the device 230 assumed the desired state may be received and the recorded state of the device representation 232 may be updated to the state assumed by the device 230. In one example, the recorded state of a device representation 232 may be used to identify the device representations 232 included in a dynamic group of device representations. The device representations 232 may be grouped into dynamic groups which may be made accessible to the clients 236, applications and services 222.

In one example, the device shadowing service 234 may include an API interface module 216, a dynamic grouping module 214, a group query module 218, and a group command module 220. The API interface module 216 may be configured to provide clients 236, applications and/or services 222 with an endpoint to the device shadowing service 234 and the dynamic groups of device representations managed by the device shadowing service 234. The API interface module 216 may be used by the clients 236, applications and/or services 222 to request actions related to a dynamic group of device representations, such as creating a dynamic group of device representations, retrieving a state of a dynamic group of device representations, and updating a state of a dynamic group of device representations.

Requests made to the device shadowing service 234 via the API interface module 216 may be authenticated using an identity and access management service 228 hosted on a server 210. The identity and access management service 228 may be configured to authenticate credentials for a client 236, application and/or service 222 in relation to dynamic group request. For example, security authentication may be performed to ensure that a device representation 232 is assigned permissions that allow the device representation 232 to be added to the dynamic group registry.

Requests received at the device shadowing service 234 via the API interface module 216 may be provided to a module configured to handle the request. For example, a request to create a dynamic group of device representations may be passed to the dynamic grouping module 214. The dynamic grouping module 214 may be configured to manage dynamic group registries 224. For example, the dynamic grouping module 214 may create, update, and terminate dynamic group registries 224. In one example, the dynamic grouping module 214 may generate dynamic groups of device representations using group definitions 238. The group definitions 238 may include one or more membership parameters that may be used to identify device representations 232 that have states that correspond to the membership parameters. For example, the dynamic grouping module 214 may query a data store 240 hosted by a server 206 for device representations 232 having states that match a membership parameter and identifiers for the device representations 232 may be returned to the dynamic grouping module 214 (e.g., select all device representations 232 having a device type of "lightbulb" and a location of "fourth floor"). The identifiers for the device representations 232 returned by the query may be used to generate a dynamic group registry 224. In one example, the dynamic group registry 224 may be stored to a data store 240 where the dynamic group registry 224 may be accessible to the device shadowing service 234. In another example, the dynamic group registry 224 may be maintained in computer memory 242 which may be accessed by the device shadowing service 234.

In one example, a dynamic group registry 224 may be managed by periodically regenerating the dynamic group registry 224 in order to add device representations 232 whose states may have changed to correspond to a group definition 238, or remove device representations 232 whose states have changed and no longer correspond to the group definition 238.

In another example, a dynamic group registry 224 may be updated or regenerated in response to an event. For example, a dynamic group registry 224 may be updated or regenerated in response to a request for a dynamic group of device representations from a client 236, application and/or service 222 (e.g., regenerate a dynamic group of lightbulbs in response to a request for the dynamic group of lightbulbs), or in response to a state change event associated with a device representation 232 included in a dynamic group of device representations (e.g., regenerate a dynamic group of "on" lightbulbs in response to a state change event that updates the state of a lightbulb from "off" to "on").

A request for state information related to a dynamic group of device representations received at the device shadowing service 234 may be passed to the group query module 218. The group query module 218 may be configured to determine a state of a dynamic group of device representations. For example, the group query module 218 may obtain identifiers for device representations 232 from a dynamic group registry 224 and query a data store 240 containing the device representations 232 for the states of the device representations 232. A state (e.g., an aggregated state or predominate state) of the dynamic group of device representations may be determined and the state may be returned to a client 236, application or service 222 in response to the request.

A request that includes a state change command directed to a dynamic group of device representations received at the device shadowing service 234 may be passed to the group command module 220. The group command module 220 may be configured to execute a group command that updates the states of the device representations included in a dynamic group of device representations. For example, in response to receiving a state change command for a dynamic group of device representations, the group command module 220 may obtain identifiers for device representations 232 from a dynamic group registry 224 and iterate through the identifiers updating a desired state of the device representations 232 to the state specified in the state change command. The states of the devices 230 associated with the device representations 232 may then be updated to the desired state of the device representations 232. For example, the device shadowing service 234 may send messages to the devices 230 instructing the devices 230 to assume the desired state. Sometime thereafter, the device shadowing service 234 may receive messages from the devices 230 indicating that the devices 230 have assumed the desired state, whereupon a recorded state of the device representations 232 may be updated to the desired state.

The system 200 may include a server 208 that hosts a device gateway 226 configured to exchange messages using a publication/subscription broker service, which enables one-to-one and one-to-many communications. A one-to-many communication pattern may allow an exchange of messages between the device shadowing service 234 and devices 230, as well as other components subscribed to receive the messages. For example, the device shadowing service 234 and/or a device 230 may publish a message to a named logical channel (e.g., topic) and the message may be distributed to subscribed system components. The device gateway 226 may support protocols that include MQTT (Message Queue Telemetry Transport), CoAP (Constrained Application Protocol), HTTP (Hyper Text Transport Protocol), or HTTPS (Hyper Text Transport Protocol Secure) protocols, as well as proprietary or legacy protocols. The device gateway 226 may be configured to scale automatically to support a number of devices 230 (thousands, millions, or even billions) using computing resources included in the service provider environment 202.

The various processes and/or other functionality included in the system 200 may be executed on one or more processors that are in communication with one or more memory modules. The system 200 may include a number of servers that are arranged, for example, in one or more server banks or computer banks or other arrangements. The servers may support the service provider environment 202 using hypervisors, virtual machine monitors (VMMs) and other virtualization software as described in greater detail later in association with FIG. 4.

The device representations 232 may be stored in one or more data stores 240. In one example, a key value data store may be used to store the device representations 232. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 202 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

One or more networks used by the system 200 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
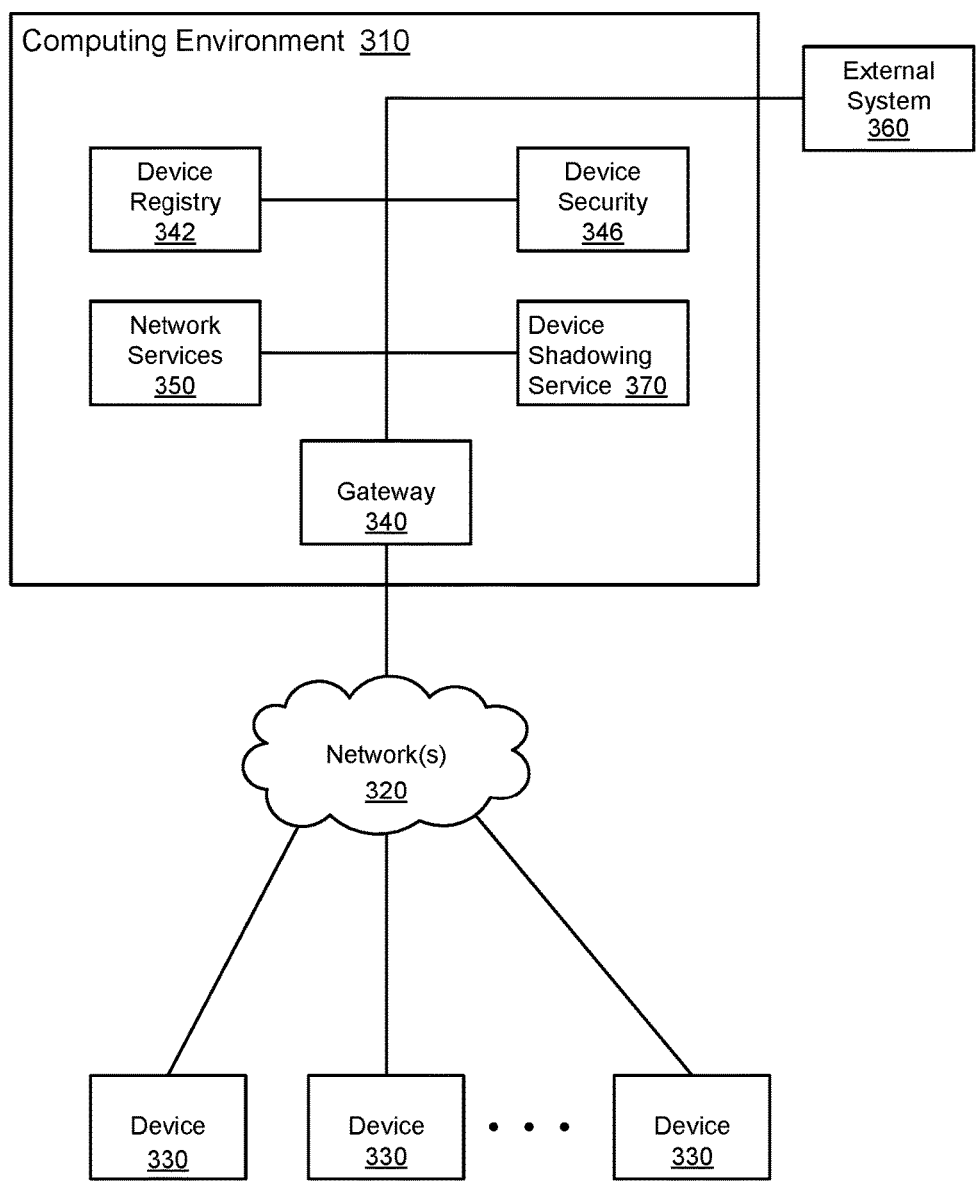
FIG. 3 is a block diagram illustrating an example computer networking architecture for providing devices access to network services.

FIG. 3 is a block diagram illustrating an example service provider environment 310 with which the devices 330 described earlier may communicate. The service provider environment 310, which may be referred to as a device communication environment or system that comprises various resources made accessible via a gateway server 340 to the devices 330 that access the gateway server 340 via a network 320. The devices 330 may access the service provider environment 310 in order to access services such as a device shadowing service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway server 340 may be configured to provide an interface between the devices 330 and the service provider environment 310. The gateway server 340 receives requests from the devices 330 and forwards corresponding data and messages to the appropriate systems within the service provider environment 310. Likewise, when systems within the service provider environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT, CoAP, HTTP, and HTTPS. The gateway server 340 may be programmed to convert the data and instructions or messages received from the devices 330 into a format that may be used by other server systems comprised in the service provider environment 310. In one example, the gateway server 340 may be adapted to convert a message received using the HTTPS protocol into a JSON formatted message that is suitable for communication to other servers within the service provider environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the service provider environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise a recorded state and a desired state. The recorded state represents the existing state of the particular device 330 as presently known to the device shadowing service server 370. The device shadowing service server 370 may be configured to manage dynamic groups of device representations as described earlier. The device shadowing service server 370 communicates with the device gateway server 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security server 346 maintains security-related information for the devices 330 that connect to the service provider environment 310. In one example, the device security server 346 may be programmed to process requests to register devices with the service provider environment 310. For example, entities such as device manufacturers, may forward requests to register devices 330 with the service provider environment 310. The device security server 346 receives registration requests and assigns unique device identifiers to devices 330 which use the device identifiers on subsequent requests to access the service provider environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server operated by or for a device manufacturer that sends requests to service provider environment 310, and device security server 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the service provider environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within service provider environment 310. The gateway server 340 may be programmed to receive and, if needed, attend to converting such requests for processing with the service provider environment 310.

Figure 4:
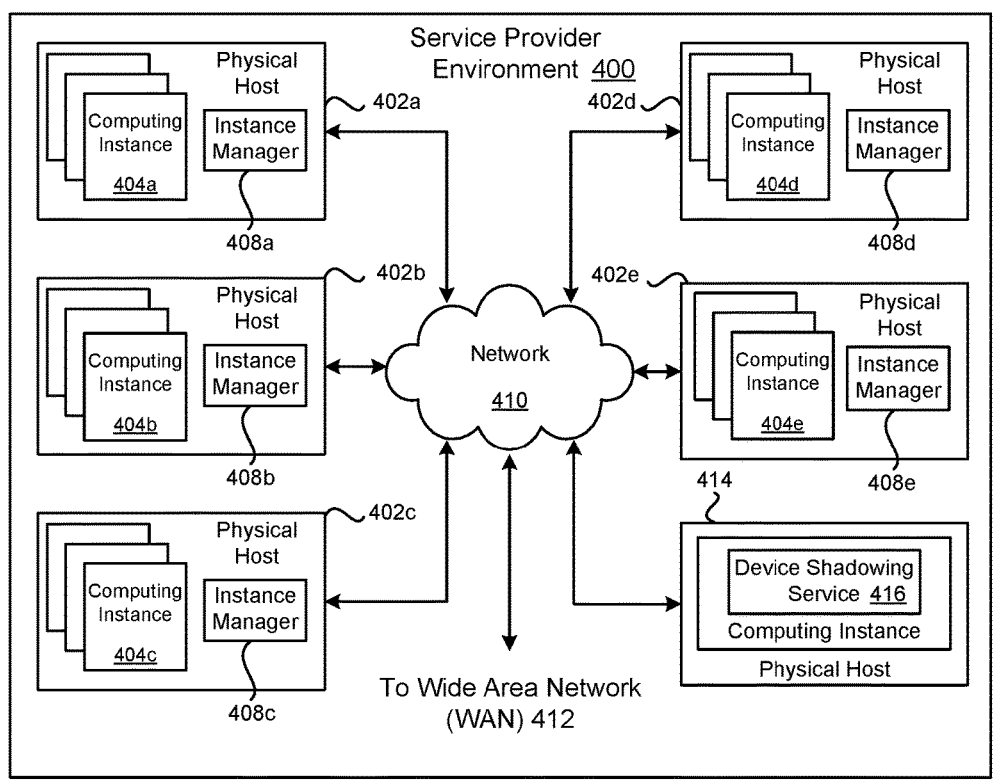
FIG. 4 is a block diagram that illustrates an example service provider environment that includes a device shadowing service.

FIG. 4 is a block diagram illustrating an example service provider environment 400 that may be used to execute and manage a number of computing instances 404a-e. In particular, the service provider environment 400 depicted illustrates one environment in which the technology described herein may be used. The service provider environment 400 may be one type of environment that includes various virtualized service resources that may be used, for instance, to host computing instances 404a-e.

The service provider environment 400 may be capable of delivery of computing, storage and networking capacity as a software service to a community of end recipients. In one example, the service provider environment 400 may be established for an organization by or on behalf of the organization. That is, the service provider environment 400 may offer a "private cloud environment." In another example, the service provider environment 400 may support a multi-tenant environment, wherein a plurality of customers may operate independently (i.e., a public cloud environment). Generally speaking, the service provider environment 400 may provide the following models: Infrastructure as a Service ("IaaS"), Platform as a Service ("PaaS"), and/or Software as a Service ("SaaS"). Other models may be provided. For the IaaS model, the service provider environment 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 400 without incurring the cost of buying and managing the underlying hardware and software. The SaaS model allows installation and operation of application software in the service provider environment 400. End customers may access the service provider environment 400 using networked client devices, such as desktop computers, laptops, tablets, smartphones, etc. running web browsers or other lightweight client applications, for example. Those familiar with the art will recognize that the service provider environment 400 may be described as a "cloud" environment.

The particularly illustrated service provider environment 400 may include a plurality of physical hosts 402a-e. While six physical hosts are shown, any number may be used, and large data centers may include thousands of physical hosts. The service provider environment 400 may provide computing resources for executing computing instances 404a-e. Computing instances 404a-e may, for example, be virtual machines. A virtual machine may be an instance of a software implementation of a machine (i.e. a computer) that executes applications like a physical machine. In the example of a virtual machine, each of the physical hosts 402a-e may be configured to execute an instance manager 408a-e capable of executing the instances. The instance manager 408a-e may be a hypervisor, virtual machine monitor (VMM), or another type of program configured to enable the execution of multiple computing instances 404a-e on a single physical host. Additionally, each of the computing instances 404a-e may be configured to execute one or more applications.

A physical host 414 may execute a device shadowing service 416 configured to execute the functions and dynamic group operations described earlier. In one example, the device shadowing service 416 may be hosted by one or more computing instances 404a-e. A network 410 may be utilized to interconnect the service provider environment 400 and the physical hosts 402a-e, 414. The network 410 may be a local area network (LAN) and may be connected to a Wide Area Network (WAN) 412 or the Internet, so that end customers may access the service provider environment 400. The network topology illustrated in FIG. 4 has been simplified, many more networks and networking devices may be utilized to interconnect the various computing systems disclosed herein.

Figure 5:
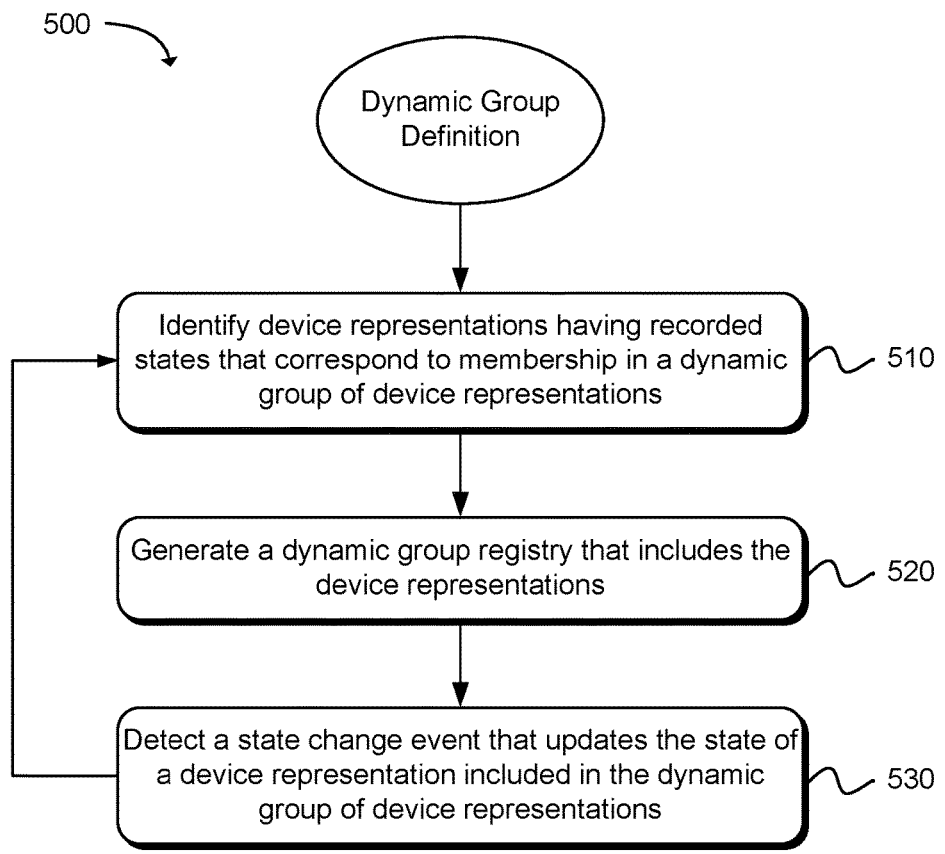
FIG. 5 is a flow diagram illustrating an example method for generating a dynamic group registry.

FIG. 5 is a flow diagram illustrating an example method 500 for generating a dynamic group registry using a dynamic group definition as described earlier. The dynamic group registry may include identifiers for device representations included in a dynamic group of device representations. As in block 510, device representations that have recorded states that correspond to membership in a dynamic group of device representations may be identified. In one example, a group definition that includes one or more membership parameters may be used to identify the device representations.

Device representations having states that correspond to the membership parameters may be identified by querying the device representations (e.g., data records that represent one or more states of a device) and as in block 520, a dynamic group registry may be generated to include the device representations (e.g., identifiers for the device representations) identified as having states that correspond to the membership parameters. The dynamic group registry may be made available to clients that address the dynamic group of device representations.

The recorded states represented by device representations may be updated to reflect the actual states of devices represented by the device representations. For example, the state of a device may change (e.g., "on" to "off", "open" to "close", etc.) and a device representation associated with the device may be updated to reflect the change in state of the device. Updating a state of a device representation may result in a state that associates or disassociates the device representation with the dynamic group of representations. As such, a state change event that updates the state of a device representation may be detected, as in block 530, which may trigger a regeneration of the dynamic group registry as in blocks 510 and 520 to add device representations having states that correspond to the group definition to the dynamic group registry and/or remove device representations having states that no longer correspond to the group definition from the dynamic group registry.

In another example, device representations may be periodically queried (e.g., every few seconds, minutes, hours, etc.) to identify device representations that have states that correspond to membership parameters of a group definition. A dynamic group registry may then be regenerated to include identifiers for the device representations identified as having states that corresponds to the group definition.

In some examples, a device representation may be added to a dynamic group registry in response to a request to add the device representation to a dynamic group of device representations. As an illustration, a mobile device may be configured to recognize a geographical location that is associated with a dynamic group of device representations and may send a request to the dynamic group asking that a device representation associated with the mobile device be added to the dynamic group. In response to a request to add a device representation to a dynamic group of device representations, the device representation may be queried to determine whether the recorded state of the device representation corresponds to a membership parameter for the dynamic group of device representations. If the state of the device representation corresponds to the membership parameter, an identifier for the device representation may be added to the dynamic group registry, thereby adding the device representation to the dynamic group of device representations.

Figure 6:
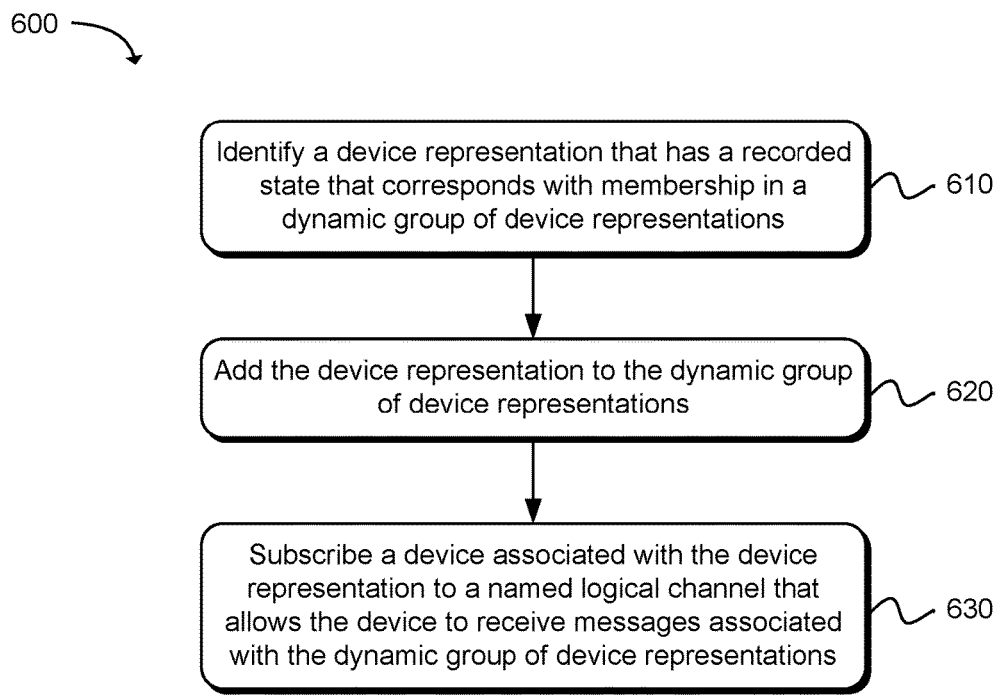
FIG. 6 is a flow diagram illustrating an example method for subscribing device representations included in a dynamic group of device representations to a named logical channel.

FIG. 6 is a flow diagram illustrating an example method 600 for subscribing device representations included in a dynamic group of device representations to a named logical channel. As described earlier, a named logical channel may be a communications channel managed by a publication/subscription broker service, which sends messages to clients registered to receive the messages via the named logical channel. A named logical channel may be created for a dynamic group of device representations and subscribers to the named logical channel may obtain information associated with the dynamic group of device representations.

As in block 610, a device representation may be identified as having a recorded state that corresponds with membership in a dynamic group of device representations, whereupon as in block 620, the device representation may be added to the dynamic group of device representations. As part of adding the device representation to the dynamic group, the device associated with the device representation may be subscribed to a named logical channel that allows the device to receive messages associated with the dynamic group of device representations, as in block 630.

Subscribing a device to a named logical channel associated with a dynamic group of device representations may enable the device to receive messages addressed to the dynamic group of device representations. As an illustration, a device representation for a mobile device may join a dynamic group of device representations having a group definition based on a geographic location. Thereafter, the mobile device may receive messages addressed to the dynamic group via the named logical channel. As a specific example, a mobile device may send a message indicating that the mobile device is located in a particular city. A device representation for the mobile device may be updated to indicate the location of the mobile device. Thereafter, the device representation may be identified as having a state that corresponds to a dynamic group of device representations and may be automatically subscribed to a named logical channel for the dynamic group used to send public alert notifications to devices located within the city.

Figure 7:
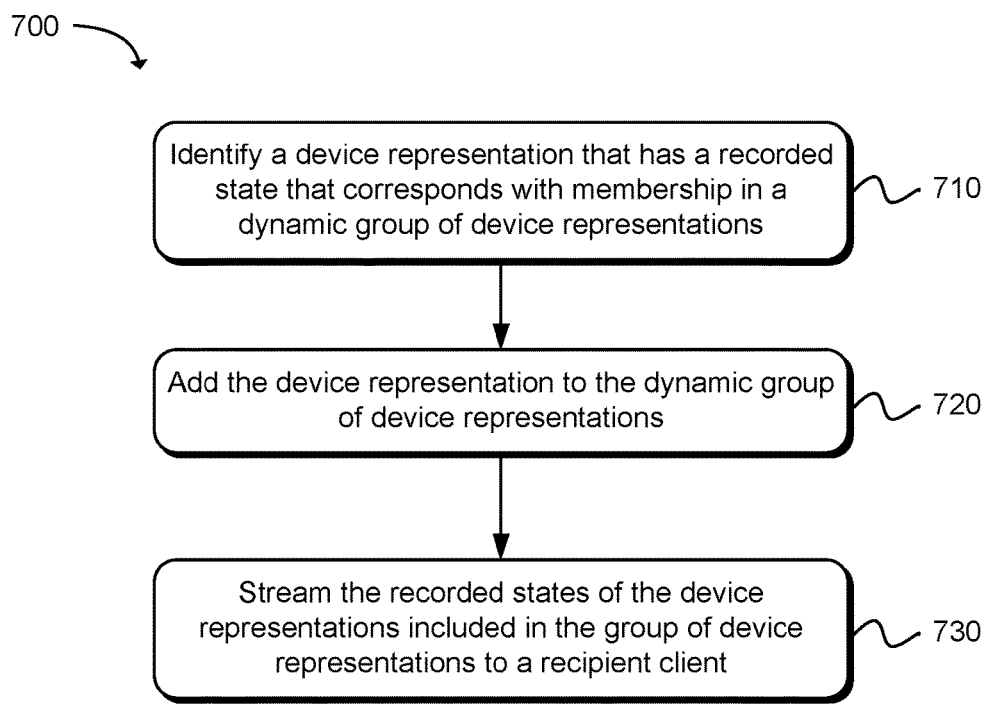
FIG. 7 is a flow diagram that illustrates an example method for streaming device states represented by device representations included in a group of device representations.

FIG. 7 is a flow diagram that illustrates an example method 700 for streaming device states represented by device representations included in a group of device representations. The state information may be streamed to clients that monitor the state information for various purposes. As in block 710, a device representation may be identified as having a recorded state that corresponds with membership in a dynamic group of device representations.

As in block 720, the device representation may be added to the dynamic group of device representations. As part of adding the device representation to the dynamic group, a recorded state represented by the device representation may be streamed to one or more clients, as in block 730, along with the recorded states of other device representations included in the dynamic group.

As one example, the states of mobile devices installed in automobiles may be represented by device representations and may be included in a dynamic group of device representations when the mobile devices are located within a certain geographical location (e.g., a street intersection). The states of the device representations associated with the mobile devices may be streamed to a monitoring service that monitors automobile traffic within the geographical location.

As another example, a customer may be notified that a device representation associated with a device has been added to a group of device representations and a recorded state represented by the device representation may be streamed to the customer. For example, a device representation for a temperature sensor may be added to a group of device representations as a result of the recorded state of the device representation being updated to a temperature value that corresponds to a group definition for the dynamic group and the recorded state may be streamed continuously to a client subscribed to receive a data stream for the dynamic group of device representations.

Figure 8:
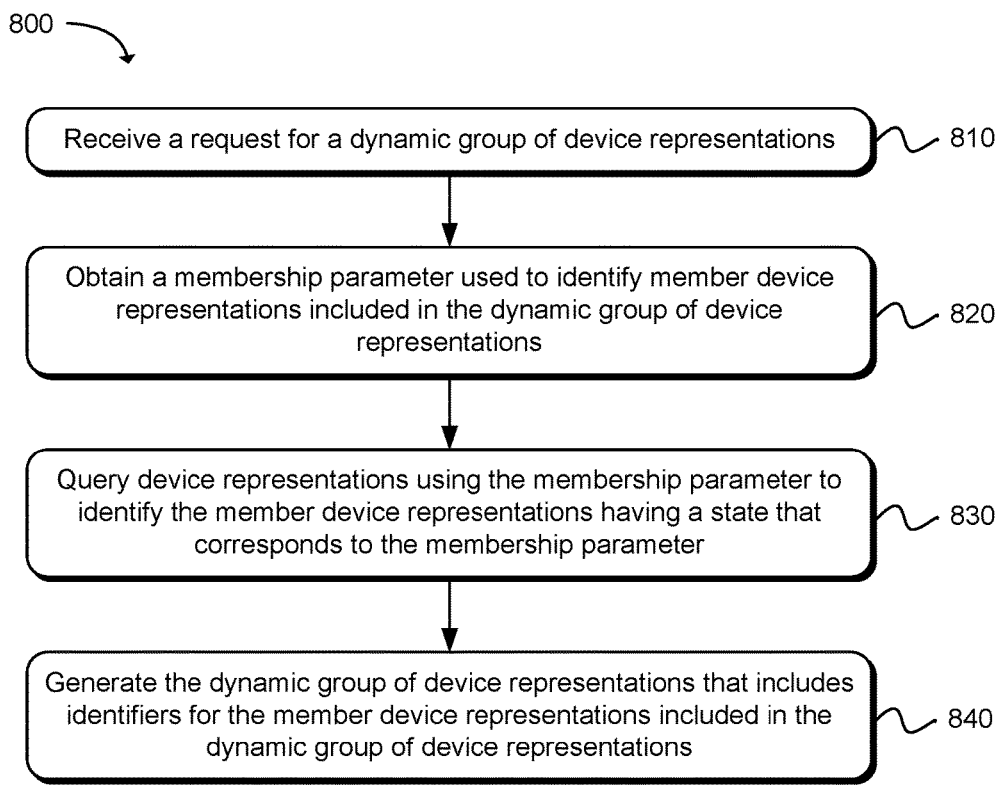
FIG. 8 is a flow diagram that illustrates an example method for generating a dynamic group of device representations.

FIG. 8 is a flow diagram that illustrates an example method 800 for generating a dynamic group of device representations that represent one or more states of devices. The devices may be addressable over one or more networks. As in block 810, a request for a dynamic group of device representations may be received at a device shadowing service configured to manage the device representations.

As in block 820, a membership parameter used to identify member device representations included in the dynamic group of device representations may be obtained. For example, a group definition for the dynamic group of device representations may be identified in response to receiving the request, or the group definition may be included in the request. The group definition may include one or more membership parameters specifying states of member device representations that are included in a dynamic group of device representations.

As in block 830, device representations may be queried using the membership parameter to identify the member device representations having a state that corresponds to the membership parameter. For example, the member device representations included in the dynamic group of device representations may be selected from device representations managed by the device shadowing service. After identifying the member device representations, as in block 840, the dynamic group of device representations may be generated. The dynamic group of device representations may include identifiers for the member device representations included in the dynamic group of device representations. The identifiers may be used by the device shadowing service to address the dynamic group of device representations.

Figure 9:
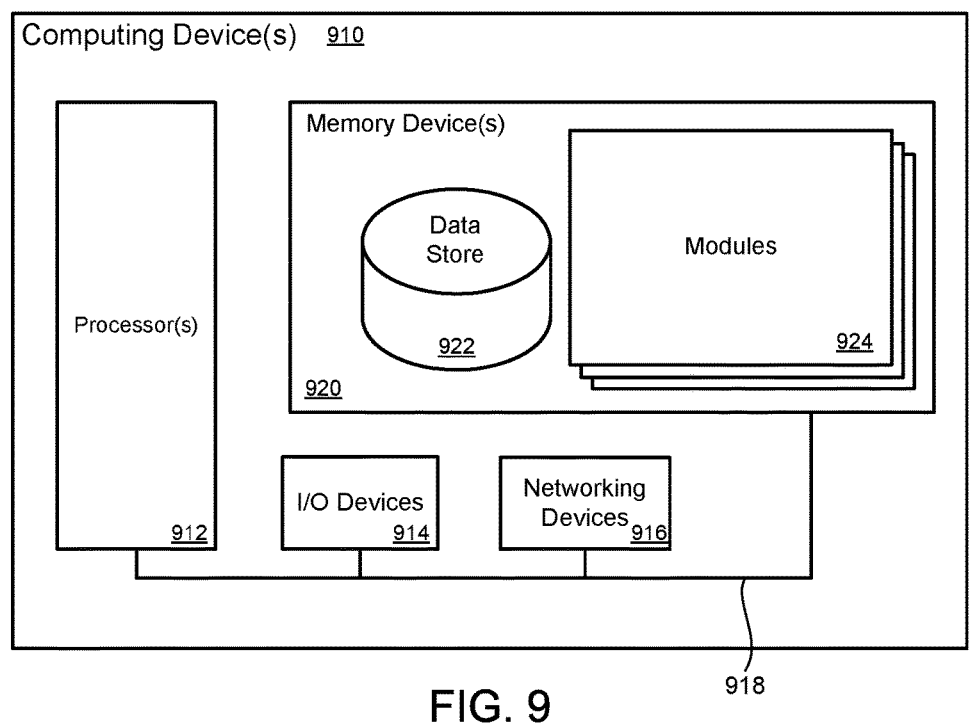
FIG. 9 is block diagram illustrating an example of a computing device that may be used to execute a method for managing dynamic groups of devices using device representations.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 may include a dynamic grouping module, a group query module, a group command module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
receiving a request for a dynamic group of device representations which represent a group of devices that are addressable over one or more networks, wherein a changeable state of a device represented by a device representation determines membership of the device representation in the dynamic group of device representations, wherein a device shadowing service, which is in communication with the devices over one or more networks, manages the device representations to monitor and manage individual states of the devices;
obtaining a membership parameter used to identify member device representations to be included in the dynamic group of device representations;
querying device representations by the device shadowing service using the membership parameter to identify the member device representations having changeable states that correspond to the membership parameter, wherein the member device representations included in the dynamic group of device representations are selected from the device representations managed by the device shadowing service; and
generating the dynamic group of device representations that includes identifiers for the member device representations included in the dynamic group of device representations, wherein the dynamic group of device representations includes an identifier for individual device representations in the dynamic group of device representations, and identifiers for device representations are used to address the device representations included in the dynamic group of device representations.

2. A method as in claim 1, wherein a member device representation included in the dynamic group of device representations is a member of multiple dynamic groups of device representations.

3. A method as in claim 1, wherein querying the device representations managed by the device shadowing service further comprises querying the device representations to identify an intersection of the member device representations included in the dynamic group of device representations and a second dynamic group of device representations.

4. A method as in claim 1, wherein querying the device representations managed by the device shadowing service further comprises querying the device representations to identify a union of the member device representations included in the dynamic group of device representations and a second dynamic group of device representations.

5. A method as in claim 1, further comprising:
   detecting that a state of a device representation included in the dynamic group of device representations no longer corresponds to the membership parameter; and
   removing the device representation from the dynamic group of device representations.

6. A method as in claim 1, wherein the request for the dynamic group of device representations further comprises:
   receiving a request to send a notification to member devices represented by the dynamic group of device representations; and
   sending a message that includes the notification to the member devices represented by the dynamic group of device representations.

7. A method as in claim 1, further comprising subscribing member devices represented by the member device representations to a named logical channel associated with the dynamic group of device representations, wherein the named logical channel is managed by a publication/subscription broker service configured to send messages to clients registered to receive the messages for the named logical channel.

8. A method as in claim 1, further comprising streaming a specified state of the member device representations included in the dynamic group of device representations to a recipient client.

9. A method as in claim 1, further comprising:
   receiving a request to subscribe a device representation to a named logical channel associated with the dynamic group of device representations; and
   adding the device representation to the dynamic group of device representations.

10. A method as in claim 1, wherein monitoring the changeable state of a member device representation included in the dynamic group of device representations that corresponds to the membership parameter further comprises:
    determining that the changeable state of the member device representation does not correspond to the membership parameter; and
    associating the member device representation with a second dynamic group of device representations having a second membership parameter that corresponds to the changeable state of the member device representation.

11. A method as in claim 1, further comprising obtaining the membership parameter from a device representation in response to a state change event that updates the changeable state of the device representation.

12. A method as in claim 1, wherein obtaining the membership parameter further comprises receiving authentication information used to identify permissions that are used to identify the member device representations included in the dynamic group of device representations.

13. A method as in claim 1, further comprising:
    determining a group state of the dynamic group of device representations, wherein the member device representations have multiple states; and
    returning the group state in response to the request for the dynamic group of device representations.

14. A method as in claim 1, wherein the request for the dynamic group of device representations further comprises:
    receiving a group command that updates a desired state of the member device representations included in the dynamic group of device representations;
    updating the desired state of the member device representations to indicate the desired state in the group command;
    sending instructions to member devices represented by the member device representations to have the member devices assume the desired state;
    receiving indications from the member devices that the member devices assumed the desired state; and
    updating a recorded state of the member device representations to indicate the desired state.

15. A method as in claim 1, wherein generating the dynamic group of device representations further comprises managing the identifiers for the member device representations included in the dynamic group of device representations in computer memory, wherein the identifiers are added and removed from the computer memory based in part on the changeable state of the member device representations.

16. A system for managing dynamic groups of devices using device representations, comprising:
    at least one processor;
    a memory device including instructions that, when executed by the at least one processor, cause the system to:
    receive a request for a listing of device representations included in a dynamic group of device representations, wherein the device representations represent devices having changeable states which determine membership in the dynamic group of device representations, and wherein a device shadowing service, which is in communication with the devices over one or more networks, manages the device representations to monitor and manage individual states of the devices;
    identify a group definition for the dynamic group of device representations that includes a membership parameter used to identify the device representations included in the dynamic group of device representations;
    query the device representations managed by the device shadowing service using the membership parameter to identify the device representations having a changeable state that corresponds to the membership parameter; and
    generate the listing of device representations included in the dynamic group of device representations, wherein the listing of device representations includes an identifier for individual device representations in the dynamic group of device representations, and identifiers for device representations are used to address the device representations included in the dynamic group of device representations.

17. A system as in claim 16, wherein the memory device includes instructions that, when executed by the processor, causes the system to further query the device representations included in the dynamic group of device representations using customer authentication information to identify the device representations that are accessible to a customer.

18. A system as in claim 16, wherein the memory device includes instructions that, when executed by the processor, causes the system to associate the device representation listing with a device representation API (Application Programing Interface) that enables a customer to obtain information associated with the dynamic group of device representations and submit commands to the dynamic group of device representations.

19. A non-transitory machine readable storage medium having instructions embodied thereon, the instructions when executed by a processor:
receive a request for a dynamic group of device representations which represent a group of devices that are addressable over one or more networks;
identify a group definition for the dynamic group of device representations defined by a membership parameter used to identify member device representations included in the dynamic group of device representations,
wherein the member device representations are selected from device representations managed by a device shadowing service, and the device representations represent devices having changeable states which determine membership in the dynamic group of device representations, and the devices are addressable by the device shadowing service configured to monitor and manage states for the devices using the device representations;
query the device representations managed by the device shadowing service using the membership parameter to identify the member device representations having a changeable state that corresponds to the membership parameter;
generate a dynamic group registry that includes identifiers for the member device representations included in the dynamic group of device representations; and
provide the dynamic group registry for use in communicating with the dynamic group of device representations, wherein the dynamic group registry includes an identifier for individual device representations in the dynamic group of device representations, and identifiers for device representations are used to address the device representations included in the dynamic group of device representations.

20. A non-transitory machine readable storage medium as in claim 19, wherein the instructions that when executed by the processor:
requery the device representations periodically to identify the member device representations having the changeable state that corresponds to the membership parameter; and
regenerate the dynamic group registry to include the identifiers for the member device representations.

21. A non-transitory machine readable storage medium as in claim 19, wherein the instructions that when executed by the processor update the dynamic group registry in response to a state change event that updates the changeable state of a device representation to correspond or to no longer correspond to the membership parameter.

22. A non-transitory machine readable storage medium as in claim 19, wherein the instructions that when executed by the processor execute a rule associated with the dynamic group of device representations in response to a state change event that updates the dynamic group registry.

23. A non-transitory machine readable storage medium as in claim 19, wherein the instructions that when executed by the processor:
receive a request to add a device representation to the dynamic group registry;
confirm that the changeable state of the device representation corresponds to the membership parameter; and
add an identifier for the device representation to the dynamic group registry, thereby adding the device representation to the dynamic group of device representations.

* * * * *